Aug. 20, 1935. W. L. SCHELLENBACH 2,012,083
MACHINE TOOL APPARATUS
Filed Oct. 9, 1930 5 Sheets-Sheet 4

Fig.4.

Inventor
William L. Schellenbach,
By C. W. Miles,
Attorney

Aug. 20, 1935.  W. L. SCHELLENBACH  2,012,083
MACHINE TOOL APPARATUS
Filed Oct. 9, 1930   5 Sheets-Sheet 5

Patented Aug. 20, 1935

2,012,083

UNITED STATES PATENT OFFICE 2,012,083

MACHINE TOOL APPARATUS

William L. Schellenbach, Wyoming, Ohio, assignor to The Cincinnati Milling Machine Company, Cincinnati, Ohio, a corporation of Ohio Application October 9, 1930, Serial No. 487,508

20 Claims. (Cl. 82—2)

My invention relates to improvements in shifting and control mechanism for lathes and other machine tools. One of its objects is to provide means whereby the gear shifts and speed changes at or adjacent to the live spindle may be initiated at or adjacent to the work or tool carriage, thereby saving time and effort on the part of the operator. Another object is to provide improved shifting mechanism. Another object is to provide improved hydraulic shifting means. Another object is to provide a combined lubricating and hydraulically actuated shifting means. Another object is to provide improved hydraulically operable shifting means adapted to operate a plurality of shifting members through an actuating member common to all of said shifting members. Another object is to provide for using the lubricant circulating system of a machine tool intermittently to effect gear shifts and speed changes as required. Another object is to provide a means by which a predetermined speed of the live spindle or work member may be set up or predetermined in advance without affecting the existing speed thereof, which existing speed continues until the operation in hand is completed, and the live spindle brought to a stop, whereupon the live spindle will commence the next operation at a new speed ratio. Another object is to provide dual means for effecting live spindle speed changes, for instance a dialed control to set up or predetermine the speed ratio, and a separate control member to actuate the shifting means. Another object is to provide shifting means for the live spindle train of driving mechanism, the members of which are operable only when the live spindle is disconnected from its source of energy. My invention also comprises certain details of form and arrangement, and combination of components, all of which will be fully set forth in the description of the accompanying drawings, in which:

It frequently occurs that due to the size of a machine tool, or the frequency with which shifting mechanism requires to be operated, that an undue amount of physical energy on the part of the operator is required, making it desirable that the shifting operations be effected by power driven means. It also frequently happens that due to the length of the machine, and the distance between the work in hand or the cutting tool, and the location of the live spindle or the shifting members usually located adjacent to the live spindle or driving member, that considerable time is lost and energy expended on the part of the operator in walking from one position to another to shift gears, change speeds, and look after the cutting tool. It is therefore desirable that the operator be enabled to spend the major portion of his time at his cutting tool, and to make such gear shifts and speed changes as may be necessary without leaving his position at the cutting tool, and without the expenditure of an undue amount of energy, and without diverting his attention and observation from his tool and work immediately in hand. Machine tool practice being largely directed to quantity production of single machine parts, it frequently happens that the operator repeats a cycle of operations each involving a change of speed of the live spindle or work feed, in which the operator may be engaged in a present operation requiring a live spindle speed of one hundred revolutions per minute, and has in mind an immediately following operation requiring for instance a live spindle speed for instance of three hundred revolutions per minute, which increased live spindle speed change it would be desirable to anticipate and provide for in advance, while the present operation is proceeding to completion, and without departing from his position at the tool. It is also desirable to provide simple, reliable and positive means adapted to be readily operable at a distance. My improved apparatus is designed to accomplish all of these advantages.

The accompanying drawings illustrate one embodiment of my invention applied to a lathe, and in which 15 represents the lathe bed, 16 the lathe ways, 17 the headstock forming a casing or housing for the live spindle 18, and for the driving mechanism by means of which the live spindle is given a wide range of speeds to meet the requirements of turning and thread-cutting.

A lathe tailstock 19 serves to center and support the work, and a main tool carriage 20 is adjustable longitudinally of the lathe ways, and is provided with a cross-feed carriage 21, operable transversely of the main tool carriage upon ways 22, by means of a cross-feed screw 23, which is operable manually or by power as desired. A tool post 24 is mounted adjustably upon a tool post carriage 24' carried by the cross-feed carriage, and is adapted to adjustably hold a tool in position thereon. The tool post carriage is fed along ways 25 by a screw 25'.

Figure 1:
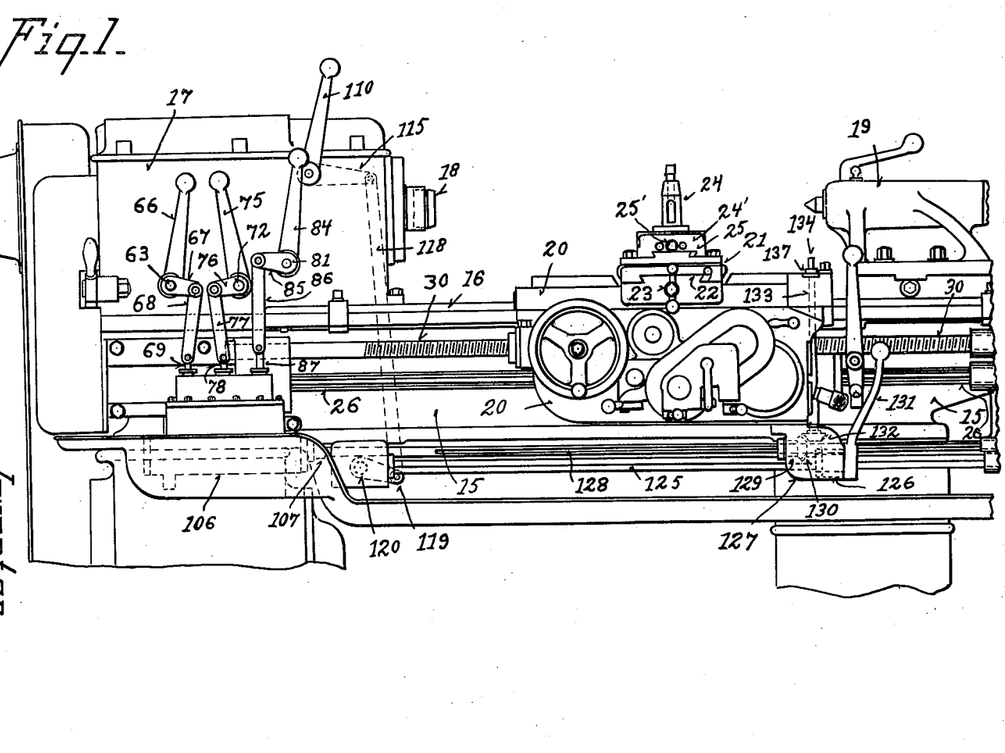
Fig. 1 is a front elevation of a lathe embodying my improvements.
Figure 2:
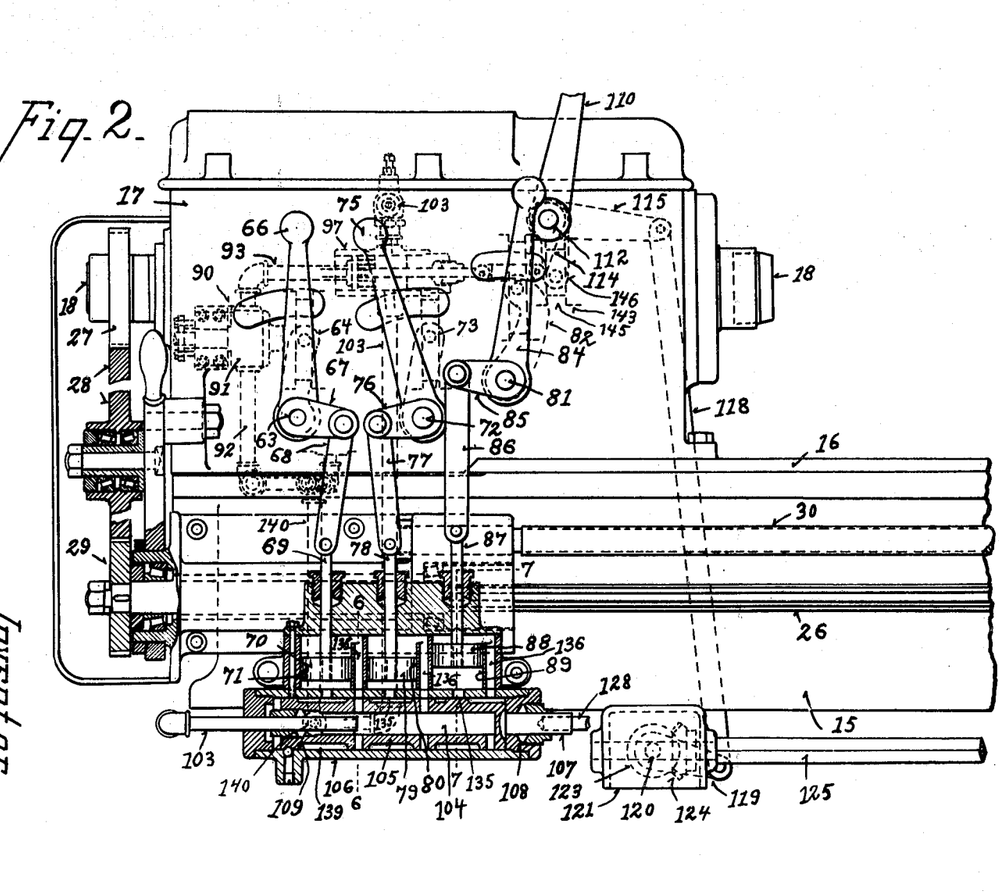
Fig. 2 is an enlarged front elevation of the headstock portion of the lathe shown in Fig. 1, partly in section.

The main tool carriage is adapted to be fed along the ways 16 for the usual turning operations by means of gear mechanism of generally known type, or of the specific type herein shown, by means of a splined shaft 26, journaled to the lathe bed, and driven through a considerable range of speeds through a train of change gears 27, 28, and 29 carried by an adjustable segment 212 from the live spindle 18. See Figs. 2 and 3. The power furnished through the shaft 26 may be employed to drive the main tool carriage along the ways 16, or to drive the cross feed carriage transversely of the main carriage. A screw threaded shaft 30 may be journaled to the lathe bed, but is preferably mounted rigidly and non-rotatably relative to the lathe bed, and is employed to feed the main tool carriages, during the operations of feeding or screw thread cutting, where accuracy and smoothness are required, the tool carriage being provided with one or more split nuts to engage the screw shaft 30, which nuts are adapted to be clutched in driving engagement with the splined shaft 26 when it is desired to cut threads or to feed the tool carriage members through the screw shaft 30.

Figure 4:
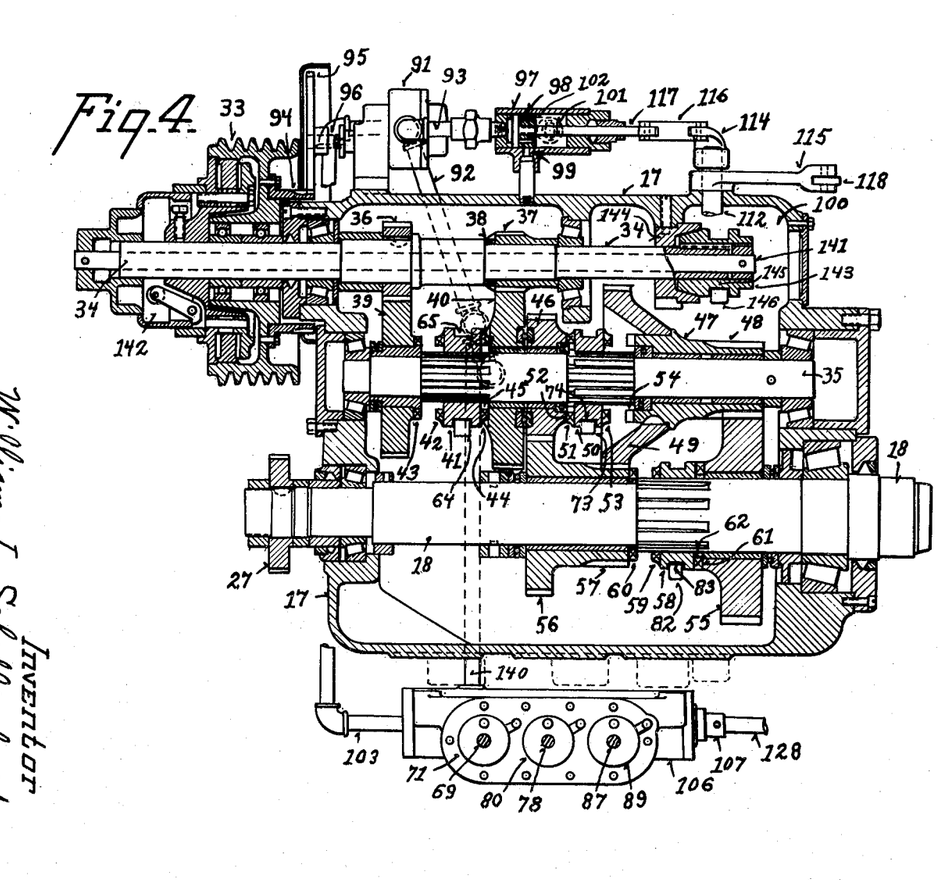
Fig. 4 is a diagrammatic sectional view through the headstock, taken on line 4—4 of Fig. 3.
Figures 5, 6, 7:
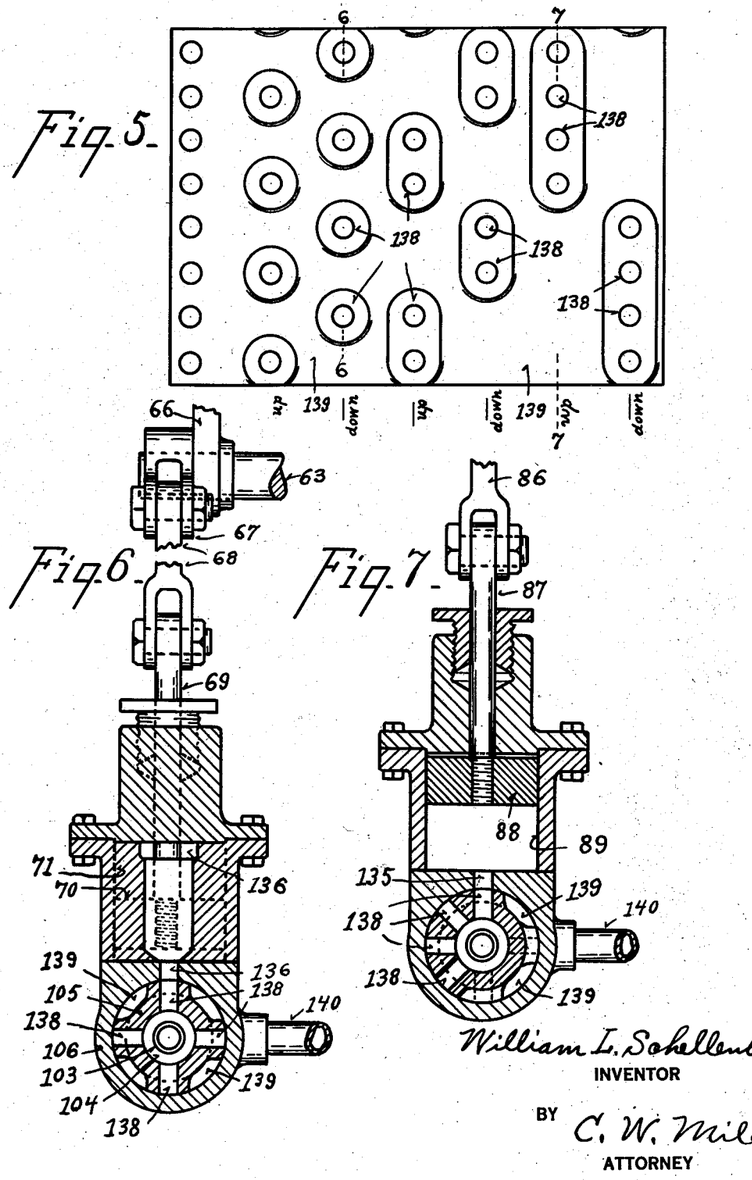
Fig. 5 is a diagrammatic plan of the fluid controlling valve.
Fig. 6 is a sectional detail through the fluid controlling valve taken on line 6—6 of Figs. 2 and 5.
Fig. 7 is a view similar to Fig. 6, taken on line 7—7 of Figs. 2 and 5.

The live spindle 18 is driven primarily through a belt pulley 33 mounted loosely upon a driving shaft 34, which in turn drives a shaft 35 through speed changing means shown in Fig. 4, and said shaft 35 in turn drives the live spindle 18 through speed changing gears shown in Fig. 4, to provide the desired range of speed changes for the live spindle 18. If desired the driving shaft 34 may be driven directly by an electric motor. The shaft 34 is ordinarily driven at uniform speed, and speed changing shifting means, for instance jaw-clutch shifting members mounted upon the shafts 34, 35, and 18, are employed to connect said shafts 34, 35, and 18, and the speed changing gears carried thereby in driving relation to secure the desired changes in speed ratio between the driving shaft 34 and the live spindle 18.

The driving pulley 33 is loose on the shaft 34, and is adapted to be clutched thereto by any clutch mechanism of known structure, or by the specific clutch mechanism shown. The shaft 34 has a gear 36 keyed thereto, and a pinion 37 mounted upon the shaft 34 and permanently clutched to shaft 34 by a clutch 38. The gear 36 drives a gear 39 mounted loosely on the shaft 35. The pinion 37 drives a gear 40 mounted loosely on the shaft 35. A collar 41 keyed to the shaft 35, and adjustable endwise thereon, is provided with a clutch member 42 to engage a clutch member 43 carried by the hub of the gear 39. The collar 41 also carries a clutch member 44 adapted to engage a clutch member 45 on the hub of the gear 40, whereby either gear 39 or gear 40 may be clutched by the collar 41 in driving relation with the shaft 35. Also the collar 41 has an intermediate idle position, in which neither gear 39 or 40 is in driving relation with the shaft 35.

A gear 46 is mounted loosely upon the shaft 35. A collar or sleeve 47 is mounted loosely upon the shaft 35. Upon one end of the sleeve 47 a pinion 48 is mounted or cut. A gear 49 is keyed to the sleeve 47. A collar 50 is keyed to and adjustable endwise upon the shaft 35 intermediate of the gears 46 and 49. The collar 50 is provided with a clutch member 51 adapted to engage a clutch member 52 mounted on the hub of the gear 46. The collar 50 is provided with a clutch member 53 adapted to engage a clutch member 54 carried by the sleeve 47. The collar 50 is adjustable from an intermediate idle position into a position to drive the shaft 35 through the gear 46, or into a position to drive the shaft 35 through the gear 49. The pinion 48 is in mesh with a gear 55 mounted loosely on the spindle 18. A gear 56 is also mounted loosely upon the spindle 18, and is continuously in mesh with the gear 46 on the shaft 35. The hub of the gear 56 has a pinion 57 mounted or cut upon its hub. A collar 58 is keyed to the spindle 18 intermediate of the gears 55 and 56, and is provided with a clutch member 59 adapted to engage a clutch member 60 carried by by the hub of gear 56. The collar 58 is also provided with a clutch member 61 adapted to engage a clutch member 62 carried by the hub of the gear 55. The collar 58 has an intermediate idle position which serves to free the clutch teeth at one end thereof before the clutch teeth at the opposite end thereof are engaged, and two active positions, one in driving relation with the gear 55 and the other in driving relation with the gear 56.

The clutch collar 41 is adapted to be shifted from one position to another upon the shaft 35 by means of a shifting shaft or rock shaft 63, which is journaled in the headstock housing, and at its inner end is provided with a forked crank arm 64, the forked free ends of which crank arm engage the annular channel 65 of the collar 41 to shift said collar endwise upon the shaft 35. Outside of the headstock housing at the front thereof the rock shaft 63 is provided with a hand actuating lever 66, and also with a power actuated crank arm 67. The crank arm 67 has pivotally attached thereto one end of a connecting link 68. The opposite end of said link is pivotally attached to the projecting end of a piston rod 69, which is attached to a piston 70 located within a cylinder 71, and adapted to be actuated by means of fluid pressure to shift said collar 41 when actuated from a position in front of the tool carriage, or other position at a distance from the headstock.

The clutch collar 50 is adapted to be shifted from one position to another upon the shaft 35 by means of a rock shaft 72 journaled in the headstock housing, and provided at its inner end with a forked crank 73, the forked ends of which engage an annular channel 74 of the collar 50, to shift said collar endwise of the shaft 35. Outside of the headstock housing, at the front thereof, the rock shaft 72 is provided with a hand actuating lever 75, and with a power actuated crank arm 76. One end of a link 77 is pivotally connected to the free end of the crank arm 76. The opposite end of the link 77 is pivotally attached to the projecting end of a piston rod 78. The piston rod is connected to a piston 79, located in a cylinder 80, and adapted to be actuated by means of fluid pressure from in front of the tool carriage or other desired locality.

The shifting collar 58 is adapted to be shifted from one position to another by means of a rock shaft 81 journaled to the headstock housing and at its inner end provided with a forked crank arm 82, the forked ends of which engage an annular groove 83 of the collar 58 to shift said collar 58 endwise on the lathe spindle 18. Outside of the headstock housing, at the front thereof a hand actuating lever 84 is attached to the rock shaft 81. A power actuated crank arm 85 is also attached to the rock shaft 81. A connecting link 86 is pivotally attached at one end to the free end of the crank arm 85. The opposite end of the link 86 is pivotally attached to the projecting end of a piston rod 87, which is connected to a piston 88 located in a cylinder 89 and adapted to be actuated by fluid pressure from in front of the tool carriage or other locality distant from the headstock.

Figures 3, 8:
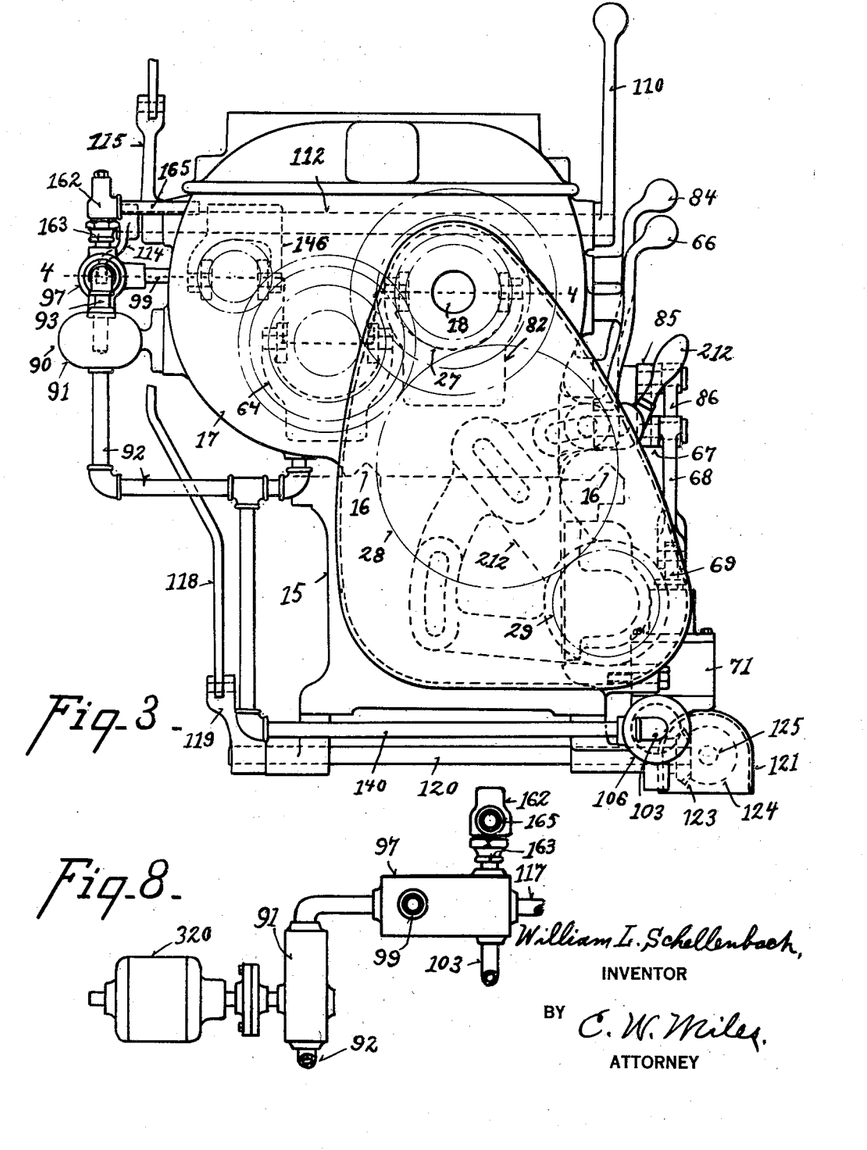
Fig. 3 is an end view of the headstock shown in Figs. 1 and 2.
Fig. 8 is a side elevation of a fluid pump apparatus illustrating a modification.

A fluid pump 90, which may be of any approved type, comprising for instance two gears in mesh within a housing 91, adapted to receive a supply of lubricating oil or other fluid through an intake conduit 92 and to discharge said fluid under pressure from the casing 91 through an exit conduit 93. The fluid pump as shown in Fig. 4 is continuously driven by means of a spur gear 94 carried by the driving pulley 33 meshing with and driving the gear 95 on the shaft 96 of one of the pump gears. If desired the fluid pump 91 may be separately and independently driven by means of an electrical motor 320 as shown in Fig. 8. The fluid under pressure is normally discharged from the pump casing 91 through conduit 93 into a valve cylinder 97, provided with an adjustable piston 98, which in Fig. 4 is shown in position to cover an exit port 99 leading from the cylinder 97 into the chamber 100 of the headstock housing containing the spindle driving gears on the shafts 34, 35, and 18, where said gears and shafts may be kept thoroughly lubricated and cooled by a nearly continuous circulation of lubricant through the headstock chamber, and thence back to the lubricant pump through an intake conduit 92 of said pump.

While the piston 98 is in the position Fig. 4 to cover the port 99, said piston also serves to uncover a port 101 leading from the cylinder 97 through a conduit 103 to the controlling valve 105. The piston 98 is provided with ports 102, which permit the fluid from the pump to pass the piston 98 and enter the conduit 103, when the piston 98 is in the position Fig. 4. A pressure relief valve 162 is preferably provided above the cylinder 97, and with a conduit 163 opposite the port 101, so as to be open at the same time as port 101. Said relief valve 162 is adapted to open automatically in the event of excessive pressure to discharge fluid from the pump past the valve 162 and through a by-pass conduit 165 into the chamber 100. The conduit 103 terminates in a valve chamber 104 within a rotatably adjustable valve 105, located in and adjustable rotatably within a cylindrical valve chamber 105. The stem 107 of valve 105 projects through a stuffing box 108 in one end of the cylinder 106. The exit of the conduit 103 projects through a stuffing box 109 where it enters the valve chamber 104. The pump 90 causes fluid pressure to be developed in the valve chamber 104 when the piston 98 is in position shown in Fig. 4 to cut off flow of lubricant to the headstock chamber 100. The piston 98 is actuated from the headstock by means of a hand lever 110 mounted upon a rock shaft 112, journaled to the headstock, and located in front of the headstock. Two crank arms 114 and 115 are mounted rigidly upon the opposite end of the rock shaft 112 at the rear of the headstock. The crank arm 114 is connected by a link 116 to the projecting end of the piston rod 117 to which the piston 98 is attached. The crank arm 115 is connected by a connecting link 118 with a crank arm 119 mounted upon a rock shaft 120, journaled in the housing 121 of a gear box attached rigidly to the lathe bed. Within the gear box 121 are two miter gears 123 and 124, one on the rock shaft 120, and the other mounted upon one end of the polygonal shaft 125 journaled and supported along the front of the lathe bed. The shaft 125 is slidable endwise through the polygonal bore of a sleeve 126 journaled to an extension 127 of the apron of the main tool carriage. A hand lever 131 attached to the sleeve 126 enables said sleeve and the shaft 125 to be rocked to thereby shift the piston 98 in either direction, without requiring the operator to leave his position in front of the tool carriage. A splined shaft 128 is journaled along the front of the lathe bed, and is attached at one end to the stem 107 of the valve 105. The shaft 128 is splined to and slidable endwise through a sleeve 129 journaled in the apron extension 127 and splined to said shaft. A miter gear 130 is attached to said sleeve and meshes with a miter gear 132 upon a vertically disposed shaft 133, journaled in bearings carried by the main tool carriage. The shaft 133 terminates at its upper end in a crank seat 134 carrying an index pointer 137 to thereby enable the rods 128 and 133 to be reliably rotated and adjusted to any desired position, and to thereby rotatably adjust the valve 105 within its cylinder 106 to any desired position, without requiring the operator to leave his position in front of the tool carriage.

The cylinder 106 is provided with a series of ports 135 adapted to admit fluid into the respective cylinders 71, 80, and 89 below the respective pistons 70, 79, and 88, to thereby elevate any selected one or more of said pistons due to the fluid pressure beneath said pistons. A series of ports 136 lead from said valve chamber 106 to admit fluid under pressure from said valve cylinder into the respective cylinders 71, 80, and 89 above the pistons 70, 79, and 88 to thereby cause any one or more of said pistons to move downwardly under fluid pressure. A series of ports 138 leading from the chamber 104 to the exterior of the valve 105, and a series of ports or passages 139 in the periphery of the valve 105 enable the valve 105 to be rotated and set to a series of different positions to open and close the respective ports 135 and 136 in a variety of combinations to thereby make any required adjustment of the respective shifting collars 41, 50, and 58, that may be required to operate the lathe without requiring the operator to leave his position before the tool carriage. A branch 140 of the conduit 92, leads the lubricant fluid ejected from the cylinders 71, 80, and 89, and also any fluid which may escape or leak past the valve 105 back to the intake of the pump 90. Where a fluid circulating system is employed to cool the work or the tool, such fluid circulating system may be employed in place of the fluid circulating system herein shown and specifically described if desired to supply fluid under pressure to the cylinders 71, 80, and 89 to actuate the speed changing members, in which event the lubricant would remain in chamber 100 without being circulated to and from said chamber.

The apparatus herein disclosed is capable of considerable modification within the scope of the claims without departing from the spirit of my invention.

What I claim is:

1. A machine tool comprising a bed, a head, a work spindle carried by said head, and adapted to be driven at a series of relatively different rates of speed, a series of shiftable speed changing elements adapted to be shifted to effect changes in the speed of said work spindle, a series of cylinders, a series of pistons mounted in said cylinders and operatively connected to said respective shiftable elements, a valve chamber provided with ports leading therefrom to said respective cylinders, a valve located in said valve chamber and adjustable to different positions therein to open and close said ports, a tool holder slidable on said bed, a dial on said tool holder connected to said valve to indicate at the tool holder the position of said valve, a fluid circulating system adapted to supply fluid under pressure to said valve chamber and exhaust fluid from said cylinders, a fluid pressure controlling valve controlling admission of fluid under pressure to said valve chamber and means carried by said tool holder to actuate said fluid pressure controlling valve.

2. A machine tool comprising a driving element, a shaft starting and stopping member operable manually to connect and disconnect said shaft in driving relation with said driving element, a work spindle, a train of driving members interposed between said driving element and said work spindle to drive said spindle, a plurality of shiftable speed changing members included in said train of driving members and separately operable while said work spindle is disconnected from said driving element, manually operable means to predetermine the next selected position of said shiftable speed changing members operable while said work spindle is connected to said driving element, and power operated means operable in unison with the movements of said starting and stopping member when moved to its stopping position to automatically shift said shiftable members from one position to the next.

3. A machine tool comprising a bed, a head, a work spindle carried by said head and adapted to be driven at a series of relatively different rates of speed, a series of shiftable speed changing elements adapted to be shifted to effect changes in the speed of said work spindle, and shiftable while said work spindle is disconnected from its driving member, a series of cylinders, a series of pistons operatively mounted in said cylinders and operatively connected to said respective shiftable elements, a valve chamber provided with ports leading therefrom to said respective cylinders, a valve located in said valve chamber and adjustable while said work spindle is in driving relation to different positions to open and close said ports, a tool holder movable on said bed, a dial on said tool holder adapted to indicate at the tool holder the position of said valve, a fluid circulating system adapted to supply fluid under pressure to said valve chamber and exhaust fluid from said cylinders, a fluid pressure controlling valve to control admission of fluid under pressure to said valve chamber, and manually operable means movable with said tool holder to actuate said fluid controlling valve.

4. A machine tool comprising a bed, a head, a work spindle carried by said head and adapted to be driven at a series of relatively different rates of speed, a tool holder movable on said bed, a series of shiftable speed changing elements adapted to be shifted to effect changes in the speed of said work spindle, and shiftable while said work spindle is disconnected from its driving member, a series of cylinders, a series of pistons operatively mounted in said cylinders and operatively connected to said respective shiftable elements, a valve chamber provided with ports leading therefrom to said respective cylinders, a setting valve located in said valve chamber and adjustable while said work spindle is in driving relation to different positions to open and close said ports, manually operable means movable with said tool holder and operable while the work spindle is being driven to adjust said setting valve, a dial to indicate at the tool holder the position of said setting valve, a fluid circulating system adapted to supply fluid under pressure to said valve chamber and exhaust fluid from said cylinders, a fluid pressure controlling valve to control admission of fluid under pressure to said valve chamber, and manually operable means movable with said tool holder to actuate said fluid controlling valve, and to start and stop said work spindle.

5. A machine tool comprising a bed, a head, a driving element, a work spindle carried by said head and adapted to be driven at a series of relatively different rates of speed, a series of shiftable speed changing elements adapted to be independently shifted to effect changes in the speed of said work spindle, a series of cylinders, a series of pistons mounted in said cylinders and operatively connected to said respective shiftable elements, a valve chamber provided with ports leading therefrom to said respective cylinders, a setting valve located in said valve chamber and adjustable to different positions therein to open and close said ports, a tool holder movable on said bed, a dial on said tool holder connected to said setting valve to indicate at the tool holder the position of said setting valve, a fluid circulating system adapted to supply fluid under pressure to said setting valve chamber and exhaust fluid from said cylinders, a fluid pressure controlling valve controlling the admission of fluid under pressure to said setting valve chamber, manually operable means movable with said tool holder to operatively connect said work spindle in driving relation with said driving element, and means operable in unison with said spindle starting and stopping means to actuate said fluid controlling valve.

6. In a system of the class described, a transmission casing, a spindle mounted in the casing, a train of gears extending to the spindle, a main power shaft for driving said gears, clutch means for connecting said main power shaft to the transmission, shifting devices located throughout the transmission casing, one adjacent each set of shiftable gears of the train, a fluid pressure device located within the casing and having transmission connection to the main power shaft, a supply conduit extending from the fluid pressure device to the respective shifting devices, a control valve located in said conduit and operated coincidentally with the operation of the clutch means for connecting the power shaft to the transmission, and a selector valve located beyond the control valve for controlling the application of the fluid pressure to a particular shifting device.

7. A hydraulic gear shifting apparatus comprising, a driven member, a clutch controlled speed change transmission for said driven member, a clutch operating lever, a fluid pressure developing means, a main supply control valve actuated by the clutch lever of the transmission, a selector valve having fluid connection to said control valve, a plurality of shifting devices associated with the respective shifting speed changing elements of the transmission, said devices having fluid connections to said selector valve, and means for setting said selector valve for controlling the fluid supply and exhaust to said devices for appropriate speed changes.

8. In a machine tool having a spindle adapted to be driven at a series of relatively different rates of speed, a carriage mounted for movement relative to said spindle, a train of spindle driving gears, a series of shiftable speed changing elements adapted to effect changes in the speed of rotation of said spindle, a series of cylinders, a series of pistons operatively connected to said respective shiftable elements, a valve chamber provided with ports leading therefrom to said respective cylinders to actuate said pistons, a valve located in said valve chamber and adjustable to different positions to set and hold said respective pistons and shiftable elements in predetermined positions relative to said cylinders and said gear train, manually operable means on the carriage for determining the position of said valve, a second valve for controlling the flow of fluid to said valve chamber, and manually operable means on the carriage for determining the operative effect of said second valve.

9. In a machine tool having a spindle adapted to be driven at a series of relatively different rates of speed, a carriage mounted for movement relative to said spindle, a train of spindle driving gears, a series of shiftable speed changing elements adapted to effect changes in the speed of rotation of said spindle, a series of cylinders, a series of pistons operatively connected to said respective shiftable elements, a valve chamber provided with ports leading therefrom to said respective cylinders to actuate said pistons, and rotatably adjustable to effect different hydraulic connections to set and hold said respective pistons and shiftable elements in different predetermined positions of combination relative to said cylinders and gear train, a second valve for controlling the flow of fluid to said valve chamber whereby the operative effect of positioning of the rotatable valve is determined, and manually operable means carried by and movable with the carriage for controlling said second valve.

10. In a machine tool having a spindle adapted to be driven at a series of relatively different rates of speed, a carriage mounted for movement relative to said spindle, a train of spindle driving gears, a series of shiftable speed changing elements adapted to effect changes in the speed of rotation of said spindle, a series of cylinders, a series of pistons operatively connected to said respective shiftable elements, a valve chamber provided with ports leading therefrom to said respective cylinders to actuate said pistons, a valve located in said valve chamber and adjustable to different positions to set and hold said respective pistons and shiftable elements in predetermined positions relative to said cylinders and said gear train, manually operable means on the carriage for determining the position of said valve, a second valve for controlling the flow of fluid to said valve chamber, manually operable means on the carriage for determining the operative effect of said second valve, and additional manual control devices adjacent the spindle and alternatively employable for determining the rate of rotation thereof.

11. In a machine tool having a spindle adapted to be driven at a series of relatively different rates of speed, a carriage mounted for movement relative to said spindle, a train of spindle driving gears, a series of shiftable speed changing elements adapted to effect changes in the speed of rotation of said spindle, a series of cylinders, a series of pistons operatively connected to said respective shiftable elements, a valve chamber provided with ports leading therefrom to said respective cylinders to actuate said pistons, and rotatably adjustable to effect different hydraulic connections to set and hold said respective pistons and shiftable elements in different predetermined positions of combination relative to said cylinders and gear train, a second valve for controlling the flow of fluid to said valve chamber whereby the operative effect of positioning of the rotatable valve is determined, manually operable means carried by and movable with the carriage for controlling said second valve, and additional manual control devices adjacent the spindle and alternatively employable for determining the rate of rotation thereof.

12. In a machine tool the combination with a support of a spindle rotatably mounted therein, a prime mover for the spindle, a transmission from the prime mover to the spindle including a plurality of gear units shiftable into various serial combinations for effecting different rates of rotation of the spindle, hydraulically actuable members for effecting such shifting, a source of fluid under pressure, and means for selectively directing the pressure fluid to the gear shifting units for determining the effective position thereof or to the gears for effecting lubrication of said gears.

13. In a machine tool of the nature described the combination with a rotatable spindle and an inclosing housing therefor, a variable speed transmission for driving the spindle, hydraulically operable means for effecting various speeds of the transmission, an hydraulic pressure source, a first conduit extending to the hydraulic gear shifting mechanisms for actuation thereof, a second conduit disposed to discharge an hydraulic medium on to the gears for lubrication thereof, a valve, and means for shifting the valve to alternatively couple either of said conduits with the source of hydraulic pressure medium.

14. In a machine tool of the nature described the combination with a rotatable spindle and an inclosing housing therefor, a variable speed transmission for driving the spindle, hydraulically operable means for effecting various speeds of the transmission, an hydraulic pressure source, a first conduit extending to the hydraulic gear shifting mechanisms for actuation thereof, a second conduit disposed to discharge an hydraulic medium on to the gears for lubrication thereof, a valve, means for shifting the valve to alternatively couple either of said conduits with the source of hydraulic pressure medium, a starting and stopping clutch for the spindle, and connections between the valve operating means and the clutch for jointly determining the effective positions of the valve and clutch.

15. In a machine tool the combination with a support of a spindle rotatably mounted thereon, of a variable speed transmission for effecting variable rates of rotation of the spindle, hydraulically actuable shifting mechanism for effecting said several rates, a first motor for supplying power to the spindle through said transmission, pump means for producing an hydraulic pressure to effect the various rate changes, and a second motor independent of the spindle transmission for driving said pump.

16. In a machine tool the combination with a support and a spindle rotatably journaled therein, a prime mover, a transmission extending from the prime mover to the spindle and including an organized variable speed mechanism, hydraulic means coupled with said mechanism for effecting various position combinations thereof to determine the rate of rotation of the spindle, a carriage mounted on the support for movement with respect to the spindle, and control means for the machine tool including a first series of controls carried by the support for determining the effective positionings of the transmission, and additional control carried by the support adjacent the spindle for determining the starting and stopping of the spindle, operating connections extending from the support adjacent the spindle to the moving carriage, a first operating device on the moving carriage coupled with said connections for selection of a desired rate of rotation of the spindle, and a second operating device carried by said movable carriage and coupled with the connections for determining the operation of the spindle starting and stopping mechanism.

17. In a machine tool the combination with a support and a spindle rotatably journaled therein, a prime mover, a transmission extending from the prime mover to the spindle and including an organized variable speed mechanism, hydraulic means coupled with said mechanism for effecting various position combinations thereof to determine the rate of rotation of the spindle, a carriage mounted on the support for movement with respect to the spindle, and control means for the machine tool including a first series of controls carried by the support for determining the effective positionings of the transmission, an additional control carried by the support adjacent the spindle for determining the starting and stopping of the spindle, operating connections extending from the support adjacent the spindle to the moving carriage, a first operating device on the moving carriage coupled with said connections for selection of a desired rate of rotation of the spindle, a second operating device carried by said movable carriage and coupled with the connections for determining the operation of the spindle starting and stopping mechanism, and connections between said second operating device and the variable speed transmission control mechanism for determining the operative effect thereof on the power transmitting units of the transmission.

18. In combination with the headstock and carriage of a lathe, a spindle, a clutch controlled driving transmission, dual control means for operating said clutch, said control means located respectively on the headstock and on the carriage, hydraulically operable speed control means for selectively shifting the transmission gears, and manipulating elements for said speed control means located adjacent each clutch control means.

19. In combination with the headstock, spindle transmission, and carriage of a lathe, a hydraulic gear shifting system for controlling the speed of rotation of the spindle, control means for said system, and dual manipulating means for selectively positioning said control means for the desired speed control, one of the manipulating means located on the headstock and the other on the carriage.

20. In combination with the headstock and carriage of a lathe including the clutch for the spindle driving transmission in the headstock, dual power control means for shifting said clutch, said clutch shifting means located respectively on the headstock and on the carriage, speed control means for selectively shifting the gears of the transmission, and a manipulating element for said speed control means located adjacent each power control means.

WILLIAM L. SCHELLENBACH.